United States Patent [19]

Cross et al.

[11] Patent Number: 4,656,839
[45] Date of Patent: Apr. 14, 1987

[54] HEAT PUMPS

[75] Inventors: William T. Cross; Colin Ramshaw, both of Cheshire, England

[73] Assignee: Imperial Chemical Industries plc, London, England

[21] Appl. No.: 689,190

[22] Filed: Jan. 7, 1985

[30] Foreign Application Priority Data

Jan. 6, 1984 [GB] United Kingdom ............... 8400324

[51] Int. Cl.$^4$ .......................................... F25B 15/00
[52] U.S. Cl. ...................................... 62/476; 62/106; 62/478
[58] Field of Search ................. 62/110, 335, 476, 106, 62/478

[56] References Cited

U.S. PATENT DOCUMENTS

| 2,350,115 | 5/1944 | Katzow | 62/335 X |
| 3,483,710 | 12/1969 | Bearint | 62/335 X |
| 4,441,332 | 4/1984 | Wilkinson | 62/335 X |

Primary Examiner—Lloyd L. King
Attorney, Agent, or Firm—Cushman, Darby & Cushman

[57] ABSTRACT

A centrifugal absorption heat pump in which the heat released on condensation of the vapor of a first working fluid is used to generate a vapor from a solution of a second working fluid, and/or heat released on absorption of a third working fluid in an absorbent is used to evaporate a fourth working fluid.

9 Claims, 3 Drawing Figures

HEAT PUMPS

This invention relates to heat pumps and particularly to absorption type heat pumps.

In absorption type heat pumps the energy input to raise the low-grade heat to a higher level is provided by heating under pressure a solution containing a vapourisable working fluid, condensing at the same higher pressure the vapour thus evolved and subsequently reabsorbing the working fluid into the solvent or absorbent. In our copending European patent application No. 84301399.6. (EP-A-0119776, publication date Sept. 26, 1984), the disclosure in which is the same as that provided in the commonly assigned copending U.S. patent application of Cross et al, Ser. No. 588,105, filed Mar. 9, 1984, incorporated herein by way of reference, there is described a novel form of absorption heat pump which is of a centrifugal design and which is capable of being designed in a compact form. The aforementioned novel form of absorption heat pump comprises a vapour generator to which a first fluid heating medium at higher temperature is charged, i.e. high-grade heat input, a condenser, to which a first fluid medium to be heated is charged, an evaporator to which a second fluid heating medium at a lower temperature is charged, i.e. low-grade heat input, and an absorber to which a second fluid medium to be heated is charged, through which components a working fluid is circulated, which working fluid is charged as a stronger solution thereof to the vapour generator in which vapour of the working fluid is generated and from which a depleted solution of the working fluid is discharged, which the vapour is charged to the condenser in which it is liquefied, the liquid from the condenser is charged to the evaporator where it is evaporated and the vapour from the evaporator is absorbed in the said depleted solution of the working fluid in the absorber with formation of the said stronger solution characterised in that at least one of the aforesaid components is in the form of a plurality of axially-spaced, parallel, rotatable discs through the thickness of which discs a heat transfer takes place from one face thereof to the other face.

We have now devised a type of centrifugal absorption heat pump which has a higher coefficient of performance than the aforementioned centrifugal absorption heat pump.

Coefficient of performance (COP) is defined by the equation:

$$COP = \frac{\text{Total heat output of the pump}}{\text{High-grade heat input at the vapour generator}}$$

According to the present invention there is provided a centrifugal absorption heat pump comprising a vapour generator to which a first fluid heating medium at a higher temperature is charged, a condenser to which a first fluid medium to be heated is charged, an evaporator to which a second fluid heating medium at a lower temperature is charged and an absorber to which a second fluid medium to be heated is charged through which components a working fluid is circulated, characterised in that a plurality of axially-spaced, parallel, rotatable discs mounted upon a rotary shaft for rotation therewith, through the thickness of each of which discs from one face thereof to the other a heat transfer takes place, are arranged and adapted such that (a) heat released on condensation of the vapour of a first working fluid on one face of one of the aforesaid discs is transferred through the thickness of the disc to generate the vapour of a second working fluid which is flowing in solution in a first absorbent across the second face of the disc which vapour of the first working fluid is generated in the vapour generator and/or (b) heat released on absorption of the vapour of a third working fluid in a second absorbent flowing across one face of one of the aforesaid discs is transferred through the thickness of the disc to evaporate a fourth working fluid flowing as a liquid across the second face of the disc, which vapour of a third working fluid is generated in the evaporator.

The aforesaid working fluids may be identical with or different from each other, and the aforesaid absorbents may be identical with or different from each other. It is preferred that the first and second fluid media to be heated are the same as each other and flow sequentially through the absorber and the condenser.

It will be appreciated that the prevailing pressures in the component parts of heat pumps according to the present invention will be chosen in the light of the working fluids(s) employed therein such that the vapour(s) of the working fluid(s) may be generated adjacent appropriate disc faces. For example, where a plurality of vapour generators are present, the pressure in a first vapour generator which receives heat from a first fluid heating medium at higher temperature is higher than the pressure in a second vapour generator which receives its heat from condensation of the vapour generated in the first vapour generator. The prevailing pressures may be readily calculated from inter alia the known latent heats of vapourisation of suitable working fluids and the temperature of the first fluid heating medium at higher temperature.

In heat pumps according to the present invention, it is preferred that heat exchange is carried out between the depleted solution of working fluid leaving the vapour generator and the stronger solution of working fluid being fed to the vapour generator; preferably such heat transfer is carried out through the thickness of one or more rotatable discs.

Centrifugal vapour generators, condensers, evaporators and absorbers comprising one or more closely-spaced discs suitable for use in heat pumps according to the present invention are more fully described in our aforementioned European patent application No. 84301399.6.

It will be appreciated that in heat pumps according to the present invention it is necessary to provide one or more pumping units to raise the pressure on the working fluid(s) in that part of the heat pump which includes the vapour generator(s) and condenser(s). The pumping unit(s) is or are conveniently of the gear pump type mounted on the rotary shaft of the heat pump.

Means to feed fluids to and discharge fluids from the components of heat pumps according to the present invention are provided at appropriate positions thereon.

Drive means to rotate the rotary shaft in heat pumps according to the present invention are conveniently electric motors.

It will be appreciated that one or more flow restriction valves are provided in heat pumps according to the present invention to maintain the pressures in the components thereof at appropriate levels.

The working fluids which are suitable for use with heat pumps according to the present invention include those which are already known in the absorption heat pump field; as examples thereof may be mentioned the chlorofluorohydrocarbons well known as refrigerants, for example Refrigerant 124, which is monochlorotetrafluoroethane. The working fluid is used in combination with a suitable absorbent therefor, which preferably is a compound of good stability and therefore able to survive without difficulty the temperature cycles which repeated use for this purpose entails. Suitable absorbents include the readily-available organic absorbents for these refrigerant materials, among which may particularly be mentioned tetraglyme (otherwise identified as 2, 5, 8, 11, 14-pentaoxapentadecane). The combination of working fluid and absorbent should be such as to have a sufficiently high heat of solution to give the required increase in temperature to the second fluid medium to be heated at the absorber.

It is often preferred, however, that the working fluid is an inorganic fluid and preferably is water. Where the working fluid is water it is often preferred that the absorbent is an inorganic medium, e.g. sodium hydroxide, although we do not exclude the possibility that it may be an organic medium bearing one or more suitable polar substituents.

The first fluid heating medium at high temperature used in a heat pump according to the present invention is preferably a hot gas, e.g. the hot gas obtained on combustion of a fossil fuel, although we do not exclude the possibility that it may be a liquid at a suitable higher temperature, e.g. water from a geothermal source.

The second fluid heating medium at lower temperature used in heat pumps according to the present invention is preferably a gas, and conveniently is air at ambient temperature, although we do not exclude the possibility that it may be a liquid, e.g. water in a river or lake.

The first and second fluid media to be heated in heat pumps according to the present invention are liquids, preferably water, and more preferably the water passes sequentially through the absorber and then the condenser. Typically, the aforesaid water is used in a central heating system, e.g. a domestic central heating system.

According to a first preferred aspect of the present invention there is provided a centrifugal absorption heat pump which comprises at least (a) a vapour generator, mounted upon a rotary shaft for rotation therewith and comprising at least one disc across a first face of which the hot gas obtained on combustion of a fossil fuel may flow and across the second face of which a first stronger solution of a working fluid may flow, at least a portion of the working fluid is vapourised from the first stronger solution and a first depleted solution of the working fluid is discharged from the second face;

(b) a condenser/vapour generator, mounted upon said rotary shaft for rotation therewith and comprising at least one disc across a first face of which the vapour of the working fluid vapourised in said vapour generator may flow and condense thereon and across the second face of which a second stronger solution of the working fluid may flow, at least a portion of the working fluid is vapourised from the second stronger solution and a second depleted solution of the working fluid is discharged from the second face;

(c) a condenser mounted upon said rotary shaft for rotation therewith and comprising at least one disc across a first face of which the vapour of the working fluid vapourised from the second face of the said condenser/vapour generator may flow and condense thereon and across the second face of which a liquid to be heated may flow;

(d) an evaporator mounted upon said shaft for rotation therewith and comprising at least one disc across a first face of which an ambient fluid source of heat may flow and across the second face of which the liquid working fluid from the condenser may flow and from which it may evaporate;

(e) an evaporator/absorber mounted upon said rotary shaft for rotation therewith and comprising at least one disc across a first face of which said second depleted solution of working fluid and the working fluid vapour vapourised in said evaporator may together flow and across the second face of which the liquid working fluid from the first face of the condenser/vapour generator may flow and may be evaporated therefrom;

(f) an absorber mounted upon said rotary shaft for rotation therewith and comprising at least one disc across a first face of which the working fluid vapour vapourised in the evaporator/absorber and the first depleted solution from the vapour generator together may flow and across the second face of which the liquid to be heated may flow before flowing to the condenser.

According to a second preferred aspect of the present invention there is provided a centrifugal absorption heat pump which comprises at least (a) a vapour generator, mounted upon a rotary shaft for rotation therewith and comprising at least one disc across a first face of which hot gases from combustion of a fossil fuel may flow and across the second face of which a first portion of a stronger solution of a working fluid may flow, at least a portion of the working fluid is vapourised from the said first portion of a stronger solution and a first depleted solution of the working fluid is discharged from the said second face;

(b) a condenser/vapour generator, mounted upon said rotary shaft for rotation therewith and comprising at least one disc across a first face of which the working fluid vapour from said vapour generator may flow and condense thereon and across the second face of which a second portion of said stronger solution of the working fluid may flow, at least a portion of the working fluid is vapourised from the said second portion of the stronger solution and a second depleted solution of the working fluid is discharged from the said second face;

(c) a condenser mounted upon said rotary shaft for rotation therewith and comprising at least one disc across a first face of which the working fluid vapour vapourised in said condenser/vapour generator may flow and condense thereon and across the second face of which a liquid to be heated may flow;

(d) an evaporator mounted upon said shaft for rotation therewith and comprising at least one disc across a first face of which an ambient fluid source of heat may flow and across the second face of which the liquid working fluid from said condenser/vapour generator and said condenser may flow and may be evaporated therefrom;

(e) an absorber mounted upon said rotary shaft for rotation therewith and comprising at least one disc across a first face of which the working fluid vapour from the evaporator and said first and second depleted solutions of the working fluid may together flow forming the said stronger solution of the working fluid and across the second face of which the liquid to be heated may flow before it flows to the condenser.

In common with the instance of the apparatus which is disclosed in the aforementioned published European patent application, the centrifugal absorption heat pump according to the present invention is symmetrical about its axis of rotation and is largely formed of a series of assorted discs and annular plates, of varying profiles. The discs and annular plates may be formed by stamping sheet metal and the heat pump may be assembled by stacking the discs and annular plates in appropriate sequence about a shaft.

The face of the plates over which working fluid vapour flows and on which it condenses has a surface designed to discourage the formation of a continuous liquid film thereon. Preferably the face of the plates is treated such that (a) condensation of the condensible vapour thereon occurs in a dropwise fashion and (b) its wettability is reduced such that formation of any continuous, stable liquid film is discouraged. Such treatments include provision of a coating of inter alia a suitable silicone or polytetrafluoroethylene on the surface.

The face of the plate(s) in vapour generator and evaporator over which flows liquids working fluid and from which it is to be evaporated, may advantageously be treated so as to assist the retention of a continuous film of liquid thereon. Such treatment, which may be chemical, e.g. etching, or physical, e.g. sand-blasting, will in general be aimed at giving the surface an overall fine roughness.

The thickness of the plates employed in the centrifugal absorption heat pump according to the present invention is generally between 0.1 mm and 5 mms, depending upon the material of construction, the specific evaporation to be carried out and the form of surface features chosen. While the thickness of the plate may vary—and obviously will vary with some forms of surface features—in general when referring to plate thickness we refer to the plate thickness as it would be without those features. It will be appreciated that the thickness of the plates should be sufficient to provide the necessary ridigity under operating conditions but thin enough to permit high thermal flux from one face to another. Typically the plate thickness is between 0.25 mm and 1.25 mm.

The outer diameter of the plates used in the centrifugal absorption heat pump according to the present invention is typically in the range 10 cm to 5 meters and is preferably between about 50 cm and 100 cm and where the plates are in the form of annuli the inner diameter thereof is typically in the range 5 cm to 1 meter.

The plates are mounted substantially parallel to each other along the common axis about which they are able to rotate and are closely adjacent to one another to form narrow passages. Preferably the mean axial depth of the passages between adjacent plates is between 0.5 mm and 10 mm and more preferably is between 2 mm and 3 mm.

The plates used in centrifugal absorption heat pumps according to the present invention are made of a suitable thermally conductive material which is able to withstand the environment to which it will be subjected during operation of the heat pump. As examples of suitable materials may be mentioned inter alia mild steel, stainless steel, copper and aluminium.

The plates, in operation, are rotated at speeds as to subject any liquid thereon to a mean acceleration, measured in a radial direction with respect to the axis of rotation, greater than the acceleration due to gravity, 'g'. The particular value selected depends upon such considerations as the size of the plates, the heat flow therethrough and the desired capacity of the heat pump in terms both of heat output and of quantity of liquid to be treated on the plates. In general, the acceleration may lie within the range from 5 to 1000 g, especially from 50 to 750 g and more preferably from 100 to 600 g.

In general, when a plate bearing liquid upon its surface is rotated, the centrifugal effect tends to move that liquid in a direction generally away from the axis of rotation. Thus the liquid to be treated on a plate in the heat pump according to the present invention is conveniently fed to the plate at a point adjacent to its axis of rotation, for example to the centre of the plate. Depleted solution of working fluid from the generator may be withdrawn from a point or ponts adjacent to the outer edge of the plate(s).

The present invention is further illustrated by reference to the accompanying drawings in which.

Figure 4:
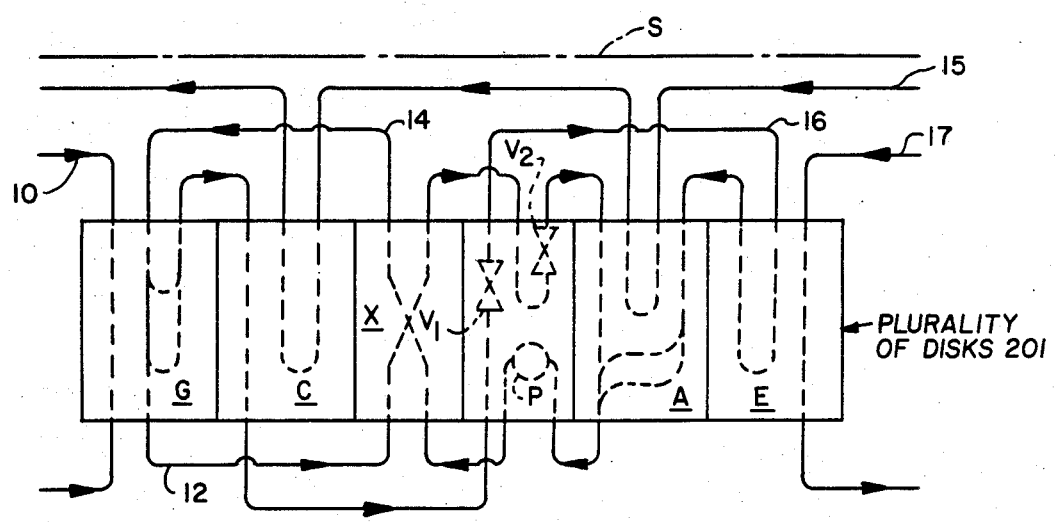
FIG. 4 illustrates in a simple schematic manner the juxtaposition of the components of an embodiment of a known absorption heat pump and the fluid flow paths therethrough.
Figure 5:
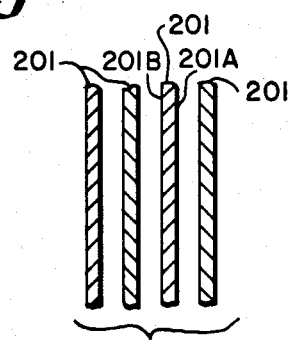
Figure 6:
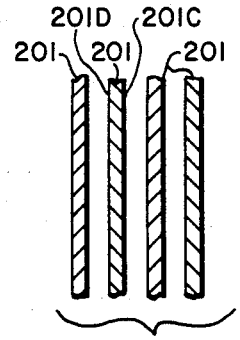

In FIG. 4, there is illustrated schematically a known centrifugal absorption heat pump. In the heat pump illustrated in FIG. 4, a working fluid is circulated by means of pump P around a system consisting of an evaporator E, an absorber A, a solution heat exchanger X, a vapour generator G and a condenser C mounted in that sequence upon a shaft at S, for rotation therewith. In the evaporator E, the working fluid is vaporised by heat exchange with a flow of ambient air (or with some alternative ambient source of heat, such as water or the ground). The vapour passes to the absorber A, in which it is absorbed into a weak solution of the vapour in a solvent, yielding up its heat of solution in doing so. The heat is taken up by heat exchange into a stream of a medium to be heated, typically a central heating medium, e.g. water or air, flowing in line 15.

The solution of working fluid in solvent emerging from the absorber A (the "strong" solution), passes via pump P to the solution heat exchanger X, wherein it takes up heat from the depleted solution (the "weak" solution), fed to the absorber, before flowing via the line 14 to the vapour generator G. In the generator, the strong solution is heated, for example directly by gas flame or indirectly with hot gas, and working fluid vapour is evolved. The resulting weak solution is returned to the absorber A via the line 12, the solution heat exchanger X and a pressure reducing valve V2.

Vapour from the generator G is conveyed to the condenser C, in which it loses heat to medium to be heated flowing in line 15 and is condensed to liquid. The liquid is finally returned to the evaporator E via expansion valve V1 and line 16.

Figure 1:
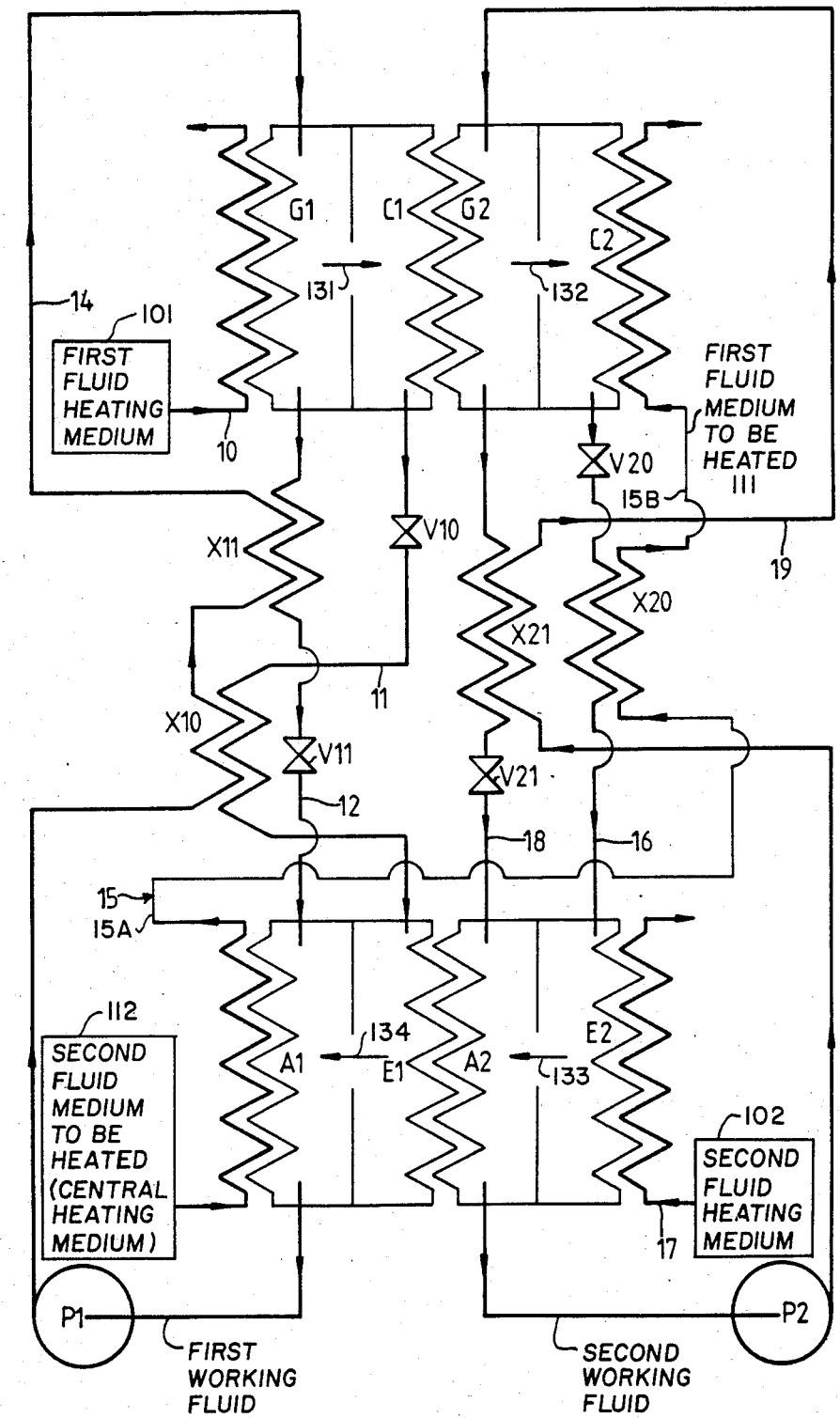
FIGS. 1, 2 and 3 illustrate in simple schematic manner the components of three heat pumps according to the present invention and the fluid flow paths therethrough.

In FIG. 1, a first working fluid, e.g. water in solution in a suitable absorbent, is circulated by pump P1, through heat exchangers X10 and X11, vapour generator G1, expansion valve V11, and absorber A1 in that sequence; and a second working fluid, which typically is also water, is circulated, in solution in a suitable absorbent, by pump P2 through heat exchanger X21, vapour generator G2, expansion valve V21, and absorber A2 in that sequence, all of which components, together with condensers C1 and C2, heat exchanger X20 and evaporators E1 and E2, are mounted, in juxtaposition, upon a shaft for rotation therewith.

Hot gas from a suitable burner in which a fuel, e.g. natural gas, is burnt is introduced to the vapour generator G1 via line 10, and heat is transferred from the hot gas through the thickness of a rotating disc to a stronger solution of the first working fluid and first working fluid vapour is generated at high pressure. The vapour travels to the condenser C1 where it condenses on a first surface of each of a plurality of rotating discs with loss of heat (H1) and formation of liquid first working fluid. The liquid first working fluid flows via expansion valve V10, in which its pressure is reduced, heat exchanger X10 and line 11 to evaporator E1.

In evaporator E1, the liquid first working fluid absorbs heat as it flows across a face of a rotating disc and evaporates to form a vapour. The vapour travels to a face of a disc in absorber A1 over which face a depleted solution of the first working fluid, obtained from vapour generator G1 via heat exchanger X11, expansion valve V11 and line 12, is flowing and in which it is absorbed to form the stronger solution of the first working fluid. The stronger solution of the first working fluid is then pumped by pump P1 via heat exchangers X10 and X11 and line 14 to the vapour generator G1.

The heat evolved by absorption of the first working fluid vapour in absorber A1 passes through the thickness of the disc therein to a central heating medium, e.g. water, which flows through line 15, heat exchanger X20 and condenser C2.

In vapour generator G2, heat H1 which has crossed the thickness of each of a plurality of rotating discs in condenser C1 to a stronger solution of the second working fluid causes vapourisation of a portion of the second working fluid and generation of vapour thereof at high pressure. The second working fluid vapour travels to the condenser C2 where it condenses on a surface of a rotating disc with loss of heat (H2) and formation of liquid second working fluid. The liquid second working fluid flows via expansion valve V20, in which its pressure is reduced, heat exchanger X20 and line 16 to evaporator E2.

In evaporator E2 the liquid second working fluid absorbs heat as it flows across a face of a disc and evaporates to form second working fluid vapour. The heat is obtained from a flow of ambient air (or from some alternative ambient source of heat, e.g. water or the ground) which is fed to the second face of the disc in the evaporator E2 by line 17. The second working fluid vapour travels to a face of a disc in absorber A2 over which a depleted solution of the second working fluid, obtained from vapour generator G2, via heat exchanger X21, expansion valve V21 and line 18, is flowing and in which it is absorbed to form the stronger solution of the second working fluid. The heat evolved during the absorption passes through the thickness of the disc to the second surface thereof which is a component of evaporator E1. The stronger solution of the second working fluid is then pumped by pump P2 via heat exchanger X21 and line 19 to the vapour generator G2.

As will be readily apparent, the total heat input to the heat pump is the sum of the low grade heat taken from the ambient source at the evaporator E2 and the high grade heat supplied to the vapour generator G1. The heat output, which is at a temperature intermediate that at the evaporator E2 and the vapour generator G1, is that taken up by the central heating medium in the absorber A1, heat exchanger X20 and condenser C2.

Figure 2:
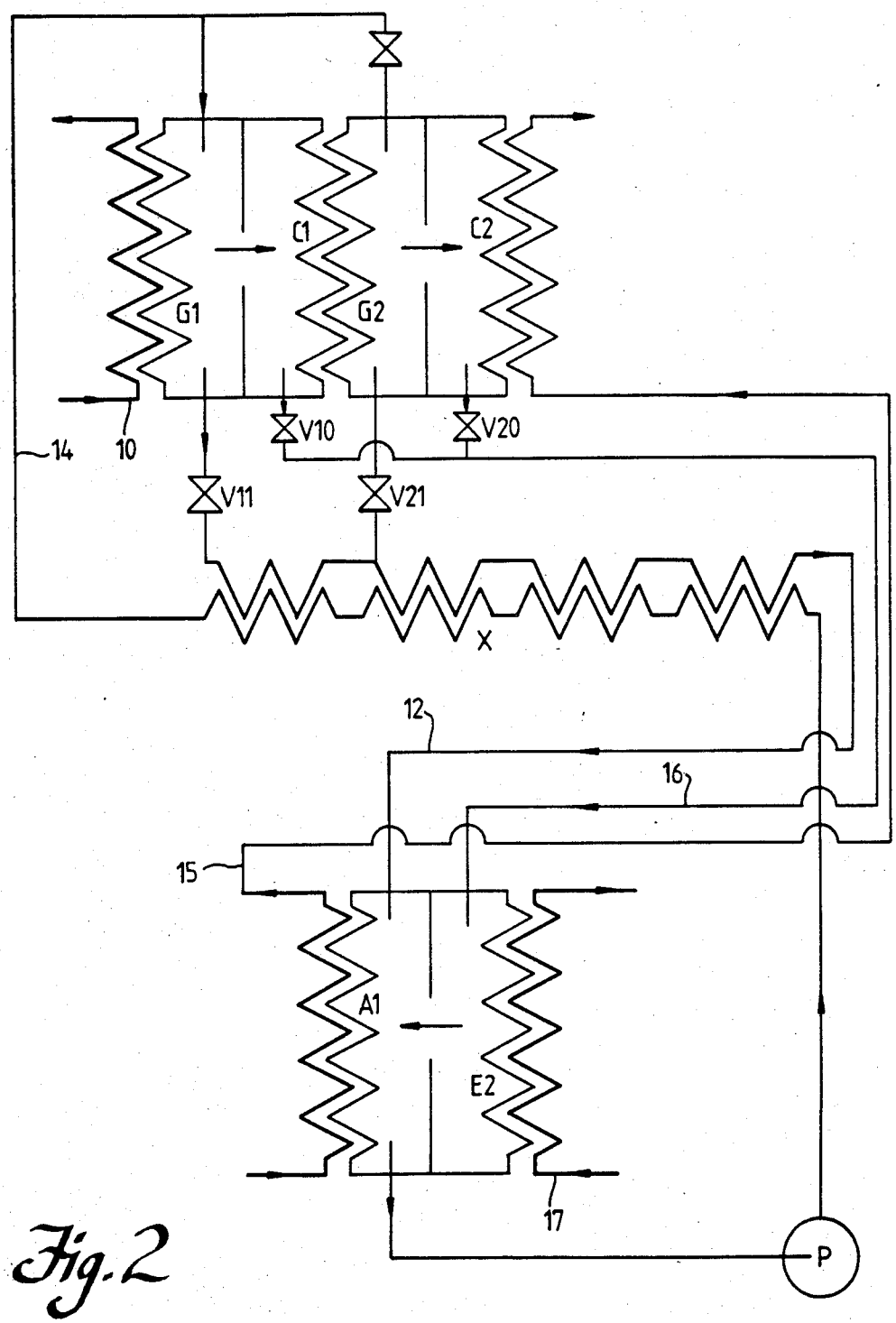

In FIG. 2, parts corresponding to those of FIG. 1 are indicated by use of the same numbering and lettering. A working fluid, in solution, is circulated by pump P through heat exchanger X, through vapour generators G1, G2 (in parallel), and absorber A1, all of which components, together with condensers C1 and C2 and evaporator E2, are mounted, in juxtaposition, upon a shaft for rotation therewith.

A stronger solution of working fluid (SS), pumped by pump P through heat exchanger X and line 14, is split into two streams SS1 and SS2 which are charged to vapour generators G1 and G2 respectively.

In vapour generator G1, hot gas from a suitable burner is introduced to the vapour generator G1 via line 10 and heat is transferred from the hot gas through the thickness of a rotating disc to SS1 and working fluid vapour is generated from SS1 at high pressure. The working fluid vapour passes to the condenser C1 where it condenses on a first surface of each of a plurality of rotating discs with loss of heat (H1) and formation of liquid working fluid (L1). The heat H1 crosses the thickness of said discs to the second faces thereof which form part of the vapour generator G2 and across which faces SS2 is flowing. Working fluid vapour is generated from SS2 at intermediate pressure. The vapour travels to the condenser C2 where it condenses on a first surface of a rotating disc with loss of heat (H2) and formation of liquid working fluid (L2).

Depleted solutions of working fluid from vapour generators G1 and G2 pass through expansion valves V11 and V21, and then together through at least a part of heat exchanger X and line 12 to absorber A1. Liquid working fluid L1 and L2 from condensers C1 and C2 passes through expansion valves V10, and V20 and line 16 to evaporator E2.

In evaporator E2, at a still lower pressure, the liquid working fluid absorbs heat as it flows across the face of a disc and evaporates to form working fluid vapour. The heat required for evaporation is obtained from a flow of ambient air (or from some alterative ambient source of heat, e.g. water or the ground) which is fed to the second face of the disc in evaporator E2 through line 17.

The working fluid vapour formed in evaporator E2 travels to a face of a rotating disc in absorber A1 across which face the aforesaid combined depleted solutions of working fluid are flowing. The vapour dissolves in the depleted solution, to form the said stronger solution of working fluid, with generation of heat. The heat crosses the thickness of the disc and is absorbed by a central heating medium flowing across the second face of the disc.

As will be readily apparent, the total heat input to the heat pump is the sum of the low grade heat taken from the ambient source of heat at the evaporator E2 and the high grade heat supplied to the vapour generator G1. The heat output, which is at a temperature intermediate that at the evaporator E2 and the vapour generator G1, is that taken up by the central heating medium in the absorber A1 and condenser C2.

Figure 3:
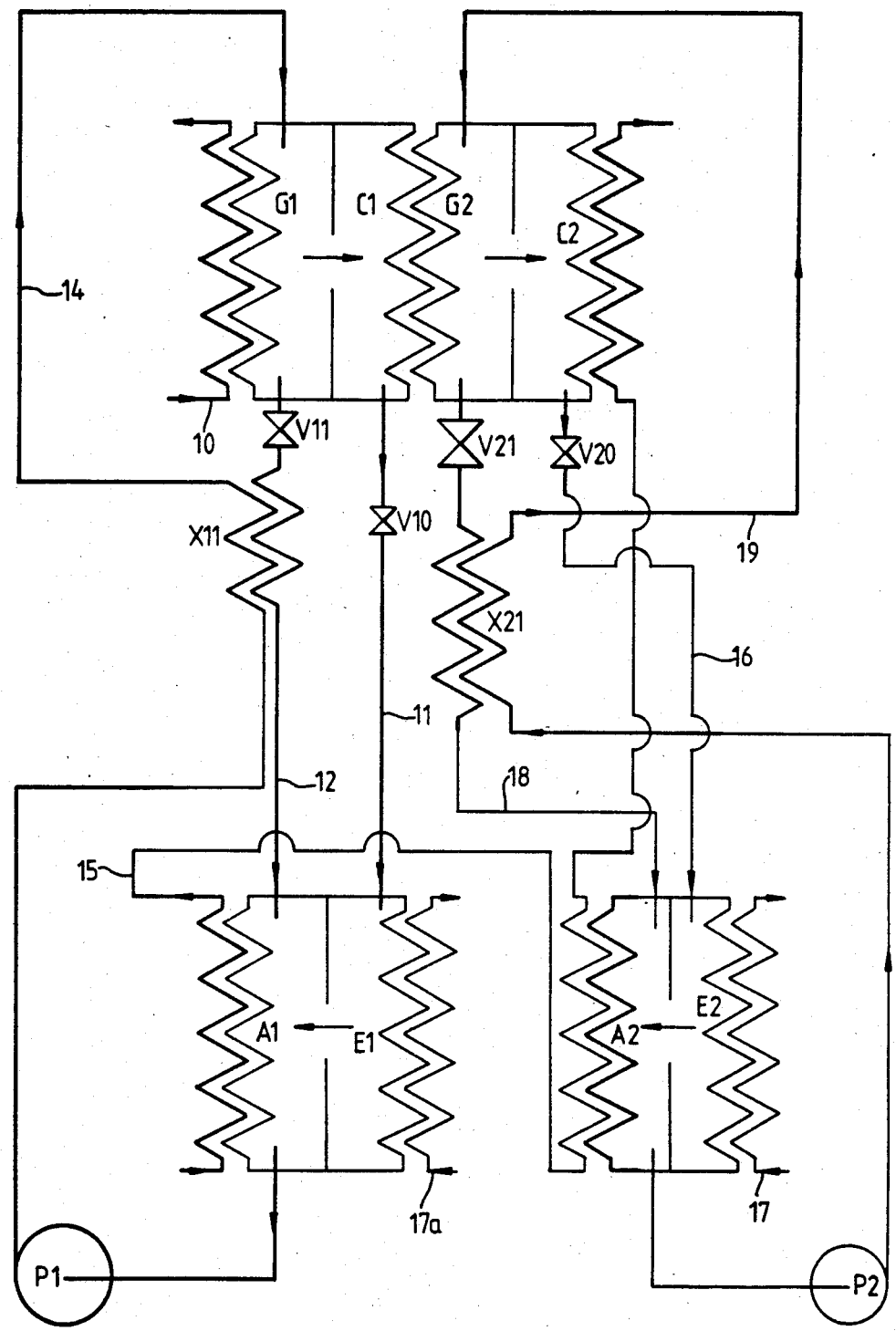

In FIG. 3, parts corresponding to those of FIG. 1 are indicated by using the same numbering and lettering. A first working fluid, in solution, is circulated by pump P1 through heat exchanger X11, line 14, vapour generator G1, expansion valve V11, line 12 and absorber A1. A second working fluid, in solution, is circulated by pump P2 through heat exchanger X21, line 19, vapour generator G2, expansion valve V21, line 18 and absorber A2.

Hot gas from a suitable burner is introduced to the vapour generator G1 via line 10 and heat is transferred from the hot gas through the thickness of a rotating disc to a stronger solution of the first working fluid and working fluid vapour is generated. The working fluid vapour travels to condenser C1 where it condenses on a first surface of a plurality of rotating discs with loss of heat (H1) and formation of liquid first working fluid. The liquid first working fluid flows via expansion valve V10, in which its pressure is reduced and line 11 to evaporator E1.

In evaporator E1, the liquid first working fluid absorbs heat as it flows across a face of a rotating disc and evaporates to form first working fluid vapour, which heat is obtained by passing an ambient source of heat via line 17a across the second face of the rotating disc. The vapour travels to a face of a disc in absorber A1 over which face a depleted solution of the first working fluid, obtained from vapour generator G1 via expansion valve V11, heat exchanger X11 and line 12 is flowing and in which it is absorbed to form the stronger solution of the first working fluid. The stronger solution is then pumped by pump P1 via heat exchanger X11 and line 14 to the vapour generator G1.

The heat evolved by absorption of the first working fluid vapour in the depleted solution thereof in absorber A1 passes through the thickness of the disc therein to a central heating medium which flows through line 15, to absorber A2, and condenser C2.

In vapour generator G2, heat H1 causes evaporation of a stronger solution of the second working fluid. The vapour of the second working fluid travels to the condenser C2 where it condenses on a surface of a rotating disc with loss of heat (H2) and formation of liquid second working fluid. The liquid flows via expansion valve V20 and line 16 to evaporator E2.

In evaporator E2 the liquid second working fluid absorbs heat as it flows acros a face of a rotating disc and evaporates to form second working fluid vapour, which heat is obtained by passing an ambient source of heat via line 17 across the second face of the rotating disc. The second working fluid vapour passes to a face of a disc in absorber A2 over which a depleted solution of the second working fluid, obtained from vapour generator G2 via expansion valve V21, heat exchanger X21 and line 18 is flowing and in which it is absorbed, with evolution of heat, to form the stronger solution of the second working fluid. The heat evolved passes to the central heating medium flowing across the second face of the disc. The stronger solution of the second working fluid is then pumped by pump P2 via heat exchanger 21 and line 19 to vapour generator G2.

As will be readily apparent, the total heat input to the pump is the sum of the low grade heat taken from the ambient sources of heat at the evaporators E1 and E2 and the high grade heat supplied to the vapour generator G1. The heat output is that taken up by the central heating medium in absorbers A1 and A2 and condenser C2.

On comparing the embodiments illustrated in FIGS. 2 and 3 with the embodiment illustrated in FIG. 1, it will be appreciated that the former two have higher COP's but have more complex mechanical lay-outs.

On comparing the embodiment illustrated in FIG. 2 with the embodiment illustrated in FIG. 3, it can be seen that (a) the FIG. 2 embodiment has the advantage of simplicity (one fluid pair and one evaporator) and the disadvantages of high operating temperatures and pressures in vapour generator G1; and (b) the FIG. 3 embodiment has the advantage that different working fluid/absorbent pairs can be chosen to reduce the pressure in the vapour generators/condensers and the disadvantage that it is mechanically more complex (two evaporators/absorbers are required).

The flow of the various fluids through the components of the illustrated pumps is such that liquids, both neat and solutions, tend to flow radially outwards and vapours radially inwards in each of the rotary components thereof. Thus, in the vapour generators, the stronger solution of working fluid flows away from the centre of the discs to the radially outer perimeter thereof whilst evolution of vapour takes place and the depleted solution is discharged at or adjacent the radially outer perimeter of the discs; the liquid working fluid formed by condensation of vapour on the discs of the condensers is discharged therefrom at or adjacent the radially outer perimeter thereof; in the absorbers, working fluid vapour and the depleted solution are charged to the discs at or adjacent the centre thereof and the stronger solution is discharged therefrom at or ajacent the radially outer perimeter thereof; and in the evaporators, liquid working fluid charged to the discs at or adjacent the centre thereof vapourises as it flows radially outwards across the faces of the discs.

The illustrated heat pumps are symmetrical about their axes and are largely formed of a series of assorted discs and annular plates of varying profiles. The discs and annular plates may be formed by stamping sheet metal and the heat pumps may be assembled by stacking the discs and annular plates in appropriate sequence about a tubular conduit which forms the axial support for the structure and which also serves to conduct a central heating medium, e.g. water, through the heat pumps.

We claim:

1. A centrifugal absorption heat pump comprising a vapour generator to which a first fluid heating medium at a higher temperature is charged, a condenser to which a first fluid medium to be heated is charged, an absorber to which a second fluid medium to be heated is charged, and an evaporator to which a second fluid heating medium at a lower temperature is charged characterised in that a plurality of axially-spaced, parallel, rotatable discs mounted upon a rotary shaft for rotation therewith, through the thickness of each of which discs a heat transfer takes place, are arranged and adapted such that (a) heat released on condensation of the vapour of a first working fluid on one face of one of the said discs is transferred through the thickness of the disc to generate the vapour of a second working fluid which is flowing in solution in a first absorbent across the second face of the disc, which vapour of the first working fluid is generated in the vapour generator; and/or (b) heat released on absorption of the vapour of a third working fluid in a second absorbent flowing across one face of one of the said discs is transferred through the thickness of the disc to evaporate a fourth working fluid flowing as a liquid across the second face of the disc, which vapour of the third working fluid is generated in the evaporator.

2. A pump as claimed in claim 1 in which the first and second media to be heated are the same as each other.

3. A pump as claimed in claim 2 in which the medium to be heated flows sequentially through the absorber and the condenser.

4. A pump as claimed in claim 3 in which the medium to be heated is water.

5. A pump as claimed in claim 1 in which at least one of the working fluids is water.

6. A pump as claimed in claim 5 in which the absorbent for the working fluid comprises sodium hydroxide.

7. A pump as claimed in claim 1 in which the first fluid heating medium comprises the gas obtained on combustion of a fuel.

8. A pump as claimed in claim 1 in which the second fluid heating medium comprises an ambient source of heat.

9. A pump as claimed in claim 8 in which the ambient source of heat is air.

* * * * *